United States Patent [19]

Flautt et al.

[11] Patent Number: 5,055,119
[45] Date of Patent: Oct. 8, 1991

[54] METHOD AND APPARATUS FOR FORMING MIGRATION FREE GLASS FIBER PACKAGES

[75] Inventors: Martin C. Flautt, Granville; Leonard J. Adzima, Pickerington, both of Ohio

[73] Assignee: Owens-Corning Fiberglas Corporation, Toledo, Ohio

[21] Appl. No.: 581,942

[22] Filed: Sep. 13, 1990

[51] Int. Cl.$^5$ .................. C03B 37/02; C03C 25/02
[52] U.S. Cl. ............................................ 65/3.1; 65/2; 65/11.1; 65/12
[58] Field of Search ............ 65/1, 2, 3.1, 3.4, 5, 65/11.1, 12

[56] References Cited

U.S. PATENT DOCUMENTS

| | | | |
|---|---|---|---|
| 3,304,163 | 2/1967 | Holschlag | 65/1 |
| 3,425,862 | 2/1969 | Eakins | 65/3.44 X |
| 3,718,448 | 2/1973 | Drummond et al. | 65/3 |
| 3,977,854 | 8/1976 | Fulmer et al. | 65/3.1 |
| 4,042,360 | 8/1977 | Kane et al. | 65/11.1 |
| 4,146,372 | 3/1979 | Bour | 65/4 |
| 4,478,625 | 10/1984 | Grubka | 65/11.1 |
| 4,676,813 | 6/1987 | Hanna et al. | 65/2 |
| 4,853,017 | 8/1989 | Eberle et al. | 65/2 |
| 4,927,445 | 5/1990 | Soszka et al. | 65/11.1 |

Primary Examiner—Robert L. Lindsay
Attorney, Agent, or Firm—Patrick P. Pacella; Ted C. Gillespie; Robert F. Rywalski

[57] ABSTRACT

Energy efficient process and apparatus are disclosed for forming glass fiber packages which are free of migration. Air from around the fiber forming bushing is passed beneath the bushing whereby it is heated by bushing heat and the heated air is then drawn into a chamber through which the glass fibers pass in heat transfer contact with the heated air. This heat transfer contact causes the water or solvent in the applied size to be evaporated and results in a migration free package.

20 Claims, 1 Drawing Sheet

METHOD AND APPARATUS FOR FORMING MIGRATION FREE GLASS FIBER PACKAGES

TECHNICAL FIELD

The present invention relates to glass fiber manufacture. More particularly it relates to drying sized fibers and even more particularly to the production of improved glass fiber packages which are migration free.

BACKGROUND OF THE INVENTION

Glass fiber packages are commonly manufactured by discharging a plurality of molten glass streams from a heated bushing, attenuating the plurality of glass streams into a plurality of fibers, passing the fibers through an applicator to apply an aqueous based size to the fibers. After this the fibers are gathered into a strand at a gathering shoe and are then wound on a collet to produce a glass fiber package. This package is then dried to evaporate the water from the aqueous based size.

Both manufacturers of such glass fiber packages and users of such packages are well aware that a problem exists which is generally referred to in the art as "migration". Migration is visually observable as a discoloration of the fibers in the package. It results during the drying process when the water is migrating outwardly in the package, taking a portion of the size with it, and thereby deposits more size than normal towards the outer periphery of the package and at various random locations along the way. One way the migration problem has been dealt with is to simply strip away the outer layers from the package to remove the discolored fiber. This, of course, wastes a good deal of material and is uneconomical. Furthermore, the edges of the packages, as when forming a Type 30 ® square-edged package, can also have this migration problem and they, of course, cannot always be stripped away. Otherwise there would be no remaining package. This means that in use there are periodic "chinks" of discolored material resulting from this edge migration occurrence. Users of such packages, of course, find this visual occurrence of "chinks" to be unsatisfactory. Thus, it will be seen that there is a problem in the art which needs to be solved.

The present invention solves this problem in a cost effective manner by eliminating migration. By practicing the present invention there will no longer be a need for stripping to remove discolored glass fiber strands because the cause of the discoloration has been eliminated. Additionally, the present invention eliminates current drying ovens thereby providing for more economical processing because of the elimination of labor and eliminating the utilization of additional energy. It has even been observed that increases in fiber tensile strengths have been obtained by using the present process in contrast to the prior art commercial processing technique. Moreover the present invention can be practiced without any "fuzz" problems. Finally the application efficiency of the size and the formation of a more uniform dried size coating on the fibers is also realized in accordance with the present invention.

DISCLOSURE OF THE INVENTION

The present invention provides an improvement in prior art glass manufacturing processes of the type which comprise discharging a plurality of molten glass streams from a heated bushing, attenuating said plurality of glass streams into a plurality of fibers, passing said fibers through an applicator to apply an aqueous based size to said fibers, gathering said sized fibers into a strand at a gathering shoe and winding said strand on a collet. The improvement comprises substantially completely adiabatically evaporating the water from the size.

In accordance with another feature of the present invention, an improvement is provided in a method for producing a package of glass fibers of the type comprising A) forming glass fibers from molten glass which is discharged from a heated bushing; B) moving said fibers downwardly and during said movement (i) applying an aqueous based size to said glass fibers with a size applicator and (ii) gathering said fibers with a gathering device into a strand; and C) winding said strand into said package with a winder. The improvement which is provided comprises forming a migration free package by drawing air into the zone adjacently downwardly of said heated bushing so as to heat said air, and passing the heated air downwardly through a confined predetermined zone which circumscribes said fibers so as to be in heat transfer contact with said fibers, the zone being disposed from a point beneath said bushing, upwardly of said applicator to a point below said applicator, and removing said air from said zone at a location above said winder, generally above the gathering shoe. The amount of air being heated is effective to dry said fibers with said applied aqueous size a sufficient amount to form a migration free package.

Yet in accordance with a more specific feature of this invention, a migration free package is provided by drawing ambient air from circumferentially about the bushing into an open uppermost end of the heat transfer chamber wherein the open end is located below a heated bushing and sufficiently close thereto so that the air being drawn into the open end is heated by the heated bushing and then moving the heated air through the chamber in heat transfer contact with the fibers, followed by removing the air from the chamber adjacent the bottom. The chamber extends beneath the size applicator and is essentially circumferentially disposed about the fibers so that the heated air can evaporate any fluid from the size, i.e., water or solvent. While minor amounts of supplemental heating may be provided in the chamber such as for example infrared heaters, it is preferred that the air be sufficiently heated by the bushing such that the bushing heat is essentially the sole source of energy for heating the air which is used to evaporate the volatile fluid part of the size.

In accordance with still another feature of this invention, the present invention can be employed to produce chopped bundles, or strands. Thus, in a method for producing a glass fiber bundle from a plurality of fibers comprising, forming glass fibers from molten glass which is discharged from a heated bushing, moving said fibers downwardly and during said movement applying an aqueous based or solvent based size to said fibers with a size applicator and gathering said fibers with a gathering device into a bundle prior to chopping, an improvement is provided which comprises drying said glass fibers prior to said gathering by (i) drawing ambient air from circumferentially about said bushing into the open uppermost end of a heat transfer chamber, the open end of said chamber being disposed below said heated bushing and sufficiently close thereto that the air being drawn into the open end is heated by said heated bushing, the chamber extending from above the size applicator and being circumferentially disposed about said fibers to a point beneath said applicator, (ii) moving said heated air through the chamber in heat transfer contact with said fibers and (iii) removing said heated air from the chamber adjacent the bottom thereof, said air thereby evaporating said water or solvent.

Compared to U.S. Pat. Nos. 4,478,625 and 3,718,448, which respectively heat fibers at the winder and prior to winding, it will be appreciated that the present invention is much more economical because the significant additional amounts of energy required for the utilization of those inventions is not required in the present invention. Additionally, those skilled in the art will readily determine that there is no recognition whatsoever of the present invention in any of U.S. Pat. Nos. 4,853,017, 4,676,813 or 4,146,377. The first two patents, for example, have chambers whose uppermost ends are disposed above the bushing bottom plate. The latter patent has a chamber disposed above the size applicator.

BRIEF DESCRIPTION OF THE DRAWINGS

Referring to the drawings.

DETAILED DESCRIPTION OF THE INVENTION INCLUDING THE BEST MODE OF CARRYING IT OUT

Figure 1:
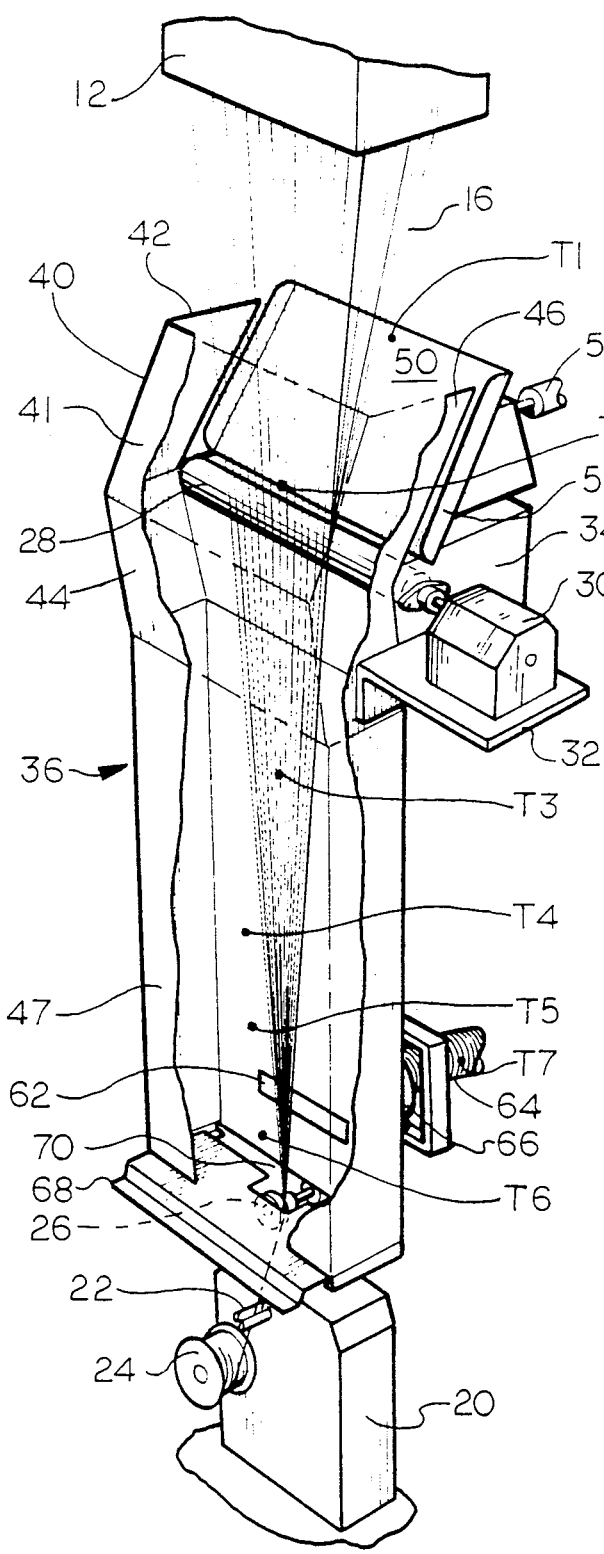
FIG. 1 is an isometric view, partially broken away exemplifying an apparatus as contemplated for use in practicing the present invention.
Figure 2:
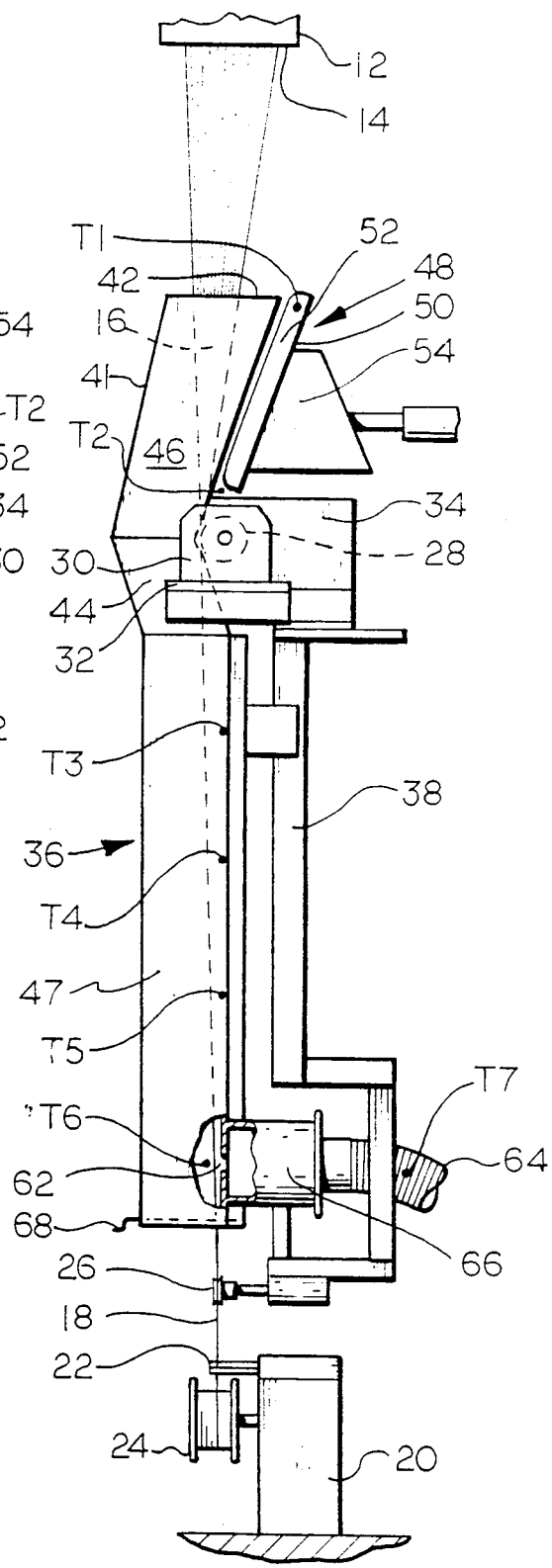
FIG. 2 is a schematic, simplified right side elevational view of the apparatus of FIG. 1.

Referring to the drawings, an apparatus is generally shown for forming glass fiber packages which are migration free. The apparatus illustrated represents the preferred technique and apparatus for practicing the invention by using bushing heat as the sole source of energy to dry sized glass fibers.

Referring to the drawings, there is generally shown a bushing member 12 from whose bottom plate 14 molten glass is discharged and the glass formed into a plurality of fibers 16. The bottom plate 14 of the bushing may be "tipless" or it may include the more conventional fiber forming tips (not shown). Additionally, it will be realized that when tips are employed, bushing 12, adjacent its bottom 14, will also include conventional fin-shields (not shown) for cooling the glass emitted from the bushing bottom. Significantly, it will be observed that no conventional prepad sprays are illustrated in the drawings. When practicing the present invention to stop migration of an aqueous size, prepad sprays are not to be used.

In accordance with conventional practice, a winder 20 attenuates the glass emanating from the bushing bottom 14 to form fibers 16. The fibers 16 are gathered into a bundle or strand 18. This strand with the assistance of a traversing mechanism 22, is wound on a collet 24 to produce a final fiber package. Any conventional gathering shoe 26 may be employed to gather the fan of fibers 16 into a strand. Also in a conventional manner, fibers 16 are brought into contact with a rotating cylindrical size applicator 28, but the applicator is positioned closer to the bushing than in normal operation. Size applicator 28, of course, rotates in a trough (not shown) which contains the size. The applicator is rotatingly driven by a suitable driving means 30 carried on a suitable support 32. Applicator 28 is generally enclosed within and rotatably carried by a housing 34.

In order to obtain the benefits of the present invention, there is provided a heat transfer, or drying, chamber generally designated 36. Chamber 36 receives air at a point above applicator 28 and maintains enclosed heat transfer contact between heated air and the fibers for a sufficient period of time that the fibers of the wound package are dry and migration free. Chamber 36, therefore, extends to a point sufficiently below applicator 28 to allow such drying to be effected. An extension of several, e.g. at least three feet below applicator 28, is required. The heat transfer chamber can be held in place by any suitable structural support generally designated 38. Chamber 36 may be viewed as including three portions, namely, an upper portion 40, a lower portion 47, and an intermediate portion 44. Upper portion 40 includes an uppermost open, generally rectangular end 42 which is disposed beneath the heated bushing 12. Generally, it is preferred that the uppermost open end portion 42 of chamber 36 be disposed about nine to about sixteen inches below the bushing bottom 14, i.e. the bottom surface of a "tipless" bushing bottom wall or the bottoms of the tips when such a bushing is employed. Upper chamber portion 40 generally proceeds forwardly and downwardly from end 42 and includes a front face 41 and rearwardly extending side panels 46. The rearmost portion of upper chamber portion 40 is defined by a conventional bead shield 48. Bead shield 48 includes a flat inclined rearward surface 50 and forwardly and extending sides 52. Rearward surface 50 and front face 41 slightly converge toward each other. Bead shield 48 includes conventional means 54 for moving the bead shield forwardly and rearwardly respectively. As shown in the drawings bead shield 48 is in its operative rearward position. Obviously, chamber 36 and its three portions should be designed and supported in a manner to allow opening and easy access to fibers 16 and applicator 28.

Middle portion or intermediate portion 44 of chamber 36 proceeds generally rearwardly and downwardly from upper portion 42.

Unlike conventional commercial installations wherein the applicator is positioned on the order of 50 to 55 inches from the bushing bottom 14, when practicing the present invention, applicator 28 will be positioned about 20 to about 30 inches from the bushing bottom 14. The applicator housing 34 generally functions as a portion of the back wall for each of chamber portion 40 and chamber portion 44 and is so arranged and constructed that the applicator is brought into contact with the fan of converging fibers 16.

Lower chamber portion 47, like upper portion 40 and middle portion 44, is rectangular in cross section and is circumferentially disposed about glass fibers 16. Rear wall 60 of lower portion 47 includes an air outlet passageway 62 near its bottom. Means are provided for removing air from the chamber and include a duct 64 attached to the negative pressure side of a suitable air pump or air blower (not shown). Duct 64 is in fluid communication with an adapter portion 66 which serves to provide fluid communication between duct 64 and the internal portions of chamber 36. If desired, a suitable slide gate (not shown) may be employed with either the duct or adaptor to control air flow. The bottom portion of the lower chamber portion 47 includes a movable slide gate 68 which controls the opening 70 through which the fibers flow en route to gathering shoe 26. This slide gate can also be used to assist in controlling the amount of air drawn into upper end 42.

It is generally recommended that the unit have a capability of moving 50 to 200 cfm of air at a glass throughput of 60 pounds and about 100 to 500 cfm at a 200 pounds per hour throughput.

When reference is made to an adiabatic evaporation or adiabatic heating or drying, it will be apparent from the drawings that adiabatic is not being used in the purest thermodynamic sense of the word. Obviously there are some inherent heat losses and heat exchange with the ambient environment but these are minor. Adiabatic means generally, therefore, that all the energy employed for drying is already in the glass melting and forming system and there is no significant additional energy added. When any reference is made in the present application to employing the bushing heat to heat the air, or heating air with a heated bushing, it will, of course, be apparent from the drawings that the air which enters the upper end 42 of upper chamber 40 also inherently receives heat, or energy, from residual heat, or energy, in the freshly formed fibers 16. Such additional heat for the air is not excluded by any reference, for example, to using bushing heat or only using bushing heat, or using a heated bushing to heat the air.

Thus referring to the drawings, it will be apparent that ambient air in the plant circumferentially about the bushing flows beneath the bottom wall 14 into the upper open end 42 of chamber 36 and proceeds downwardly through the chamber 36 and is removed adjacent the bottom of chamber 36 through duct 64. In this way, the fluid, whether it be solvent or in the preferred embodiment water from an aqueous based size, is evaporated from the fibers and removed through duct 64. The package formed by winding strand 18 on collet 24 will be completely dry and free of migration problems.

Those skilled in the art will really appreciate that for any specific operation adjustments will be needed both in terms of the size of the drying chamber, the size of the fibers, the rates at which they are drawn and the amount of size applied.

In order to aid those in making and using the present invention, further information with regard to process parameters are now provided. The specifics are essentially directed to the use of a chamber 36 whose lower portion 47 had a height of approximately 46 inches, an intermediate portion 44 having a height of approximately six and one-half inches and an upper portion 42 which had a height of approximately fifteen inches. The dimensions of the lower chamber 47 were about 13 $\frac{3}{4}''\times 4\frac{3}{4}''$. This was approximately the same cross sectional dimensions of the lowest part of upper portion 40 and the intermediate portion 44. The rectangular configuration of the chamber directly outwardly adjacent applicator 28 was approximately 13 $\frac{3}{4}''\times 4\frac{3}{4}''$ as measured from the innermost extending surface portion of the cylindrical applicator. When the bead shield 48 was in its rearward operative position, its sides 52 were generally disposed slightly ($\frac{1}{4}''$) outwardly of panels 46 of upper chamber portion 40. The rearmost portions of walls 46 and the forwardmost portions of sides 52 also had a slight gap ($\frac{1}{4}''$). With that positioning, the dimension of upper open end 42 was about 16 $\frac{1}{2}\times 7$ inches. Bushing 12 included a bottom plate containing tips (not shown) and the distance between the uppermost portion 42 of chamber 36 and the bottom of the tips was approximately 14 inches. Conventional fin-shield cooling (not shown) was also employed. The distance from the centerline of the applicator 28 to the bottom of the tips was approximately 29 inches. The bottom of chamber 36 was located about 21 inches above the gathering shoe. It is believed that the fibers are completely dry at the gathering shoe, but measurements have only been made on the formed packages.

Excellent results have been obtained with E glass generally using large fibers and slow strand speeds. For example, outstanding results will be obtained using the above specific apparatus with H and larger fibers, i.e. strands having nominal monofilament diameters in excess of about 40 hundred-thousandths (HT) (0.00040) inch. Excellent results have been obtained with H, K, M and T fibers, respectively, having monofilament diameters of about 40-45 HT, 50-55 HT, 60-65 HT, and 90-95 HT, respectively. Strand speeds have generally been on the order of about 600 (T fibers) ft./min. to about 3500 ft./min. (H fibers).

The fluid of the size may either be an organic solvent or water. As indicated, maximum benefit of the present invention is obtained when employing an aqueous based size. Such size compositions are well known in the art. Aqueous based sizes typically include about 93 to about 96 or 97% water with the balance of the size comprising various size constituents which vary depending on the application. Generally, the size constituents may include one or more film formers, such as for example an epoxy, lubricants, surfactants, for example, monionic, cationic and anionic surfactants, thickeners and coupling agents. Typically the size which is applied will provide a water content of approximately at least about 6% up to about on the order of about 12 or 13%. Best results have been obtained by using a water content in the order of about 10% and completely drying the fibers, that is drying them to a moisture content of less than about 0.02% water. This eliminates migration.

In the drawings, locations of various thermocouples are set forth by the designations T1, T2, . . . T7. Table I below generally summarizes typical operating temperatures at those various locations.

TABLE I

| Location | Temp. Range |
| --- | --- |
| T1 | 485° F.–600° F. |
| T2 | 438° F.–556° F. |
| T3 | 335° F.–463° F. |
| T4 | 259° F.–370° F. |
| T5 | 270° F.–381° F. |
| T6 | 233° F.–331° F. |
| T7 | 214° F.–288° F. |

Although not exemplified in the drawings, air immediately adjacent the applicator in the chamber typically runs about 350° F. to about 480° F.

Unlike conventional processing wherein the forming package is cool because of the substantial presence of water from the size the present process is characterized by packages having elevated temperatures because the water has been completely evaporated and the fibers heated prior to winding. The temperatures of the fibers wound on the collet may be greater than 130° F., preferably at least about 150° F. for 60-70 lb. per hour glass throughput. To ensure complete drying at higher throughputs, e.g. 200 lb. per hour, a temperature of at least about 210° F. is desirable.

The following is intended to further illustrate the present invention. In the examples which follow, the size which was employed was a conventional aqueous based size containing approximately 95% water and approximately 5% solids. The size solids included polyvinylpyrrolidone, a mineral oil lubricant, polyethylene glycol monostearate, gamma-aminopropyltriethoxy silane, gamma-methacryloxy, propyltriethoxysilane, acetic acid, an ethylene oxide-propylene oxide surfactant and a bisphenol A-epichlorohydrin epoxy resin having an epoxy equivalent of about 230-250. In all cases, E glass packages were employed.

Example I

M-450 E glass packages were made using a bushing containing approximately 2000 holes. The glass throughput was about 60 pounds per hour and the strand speed was about 1350 feet per minute. The size was applied so as to provide a water content of about 10% by weight. During operation, the temperature in the intermediate chamber 44 at a point approximately 9 inches below the applicator ran between about 350°-410° F. and the temperature in the lower chamber portion 47, approximately 6 inches from the bottom, varied between about 200°-220° F. The temperature of the fibers on the formed packages were about 130°-140° F. and the fiber water content was between 0 and about 0.02% on the package.

The packages were visually inspected and it was observed that the dry packages had no observable discoloration which is characteristic of the migration problem. Additionally, it was observed during winding that there was an excellent package build.

The water evaporation rate during this mode of operation was approximately 52 grams of water per minute.

Example II

In a similar manner, K-675 packages were produced but using a strand speed of approximately of 2025 feet per minute. The same outstanding results were obtained. The water evaporation rate was also about 52 gm/min.

Example III

In a similar manner, T-225 E glass packages were formed using a strand speed of about 675 feet per minute. The water evaporation rate was 52 gms/min. Again the same excellent results were obtained.

In forming the packages as above virtually no fuzz problems were encountered. Except for one run which showed a 1% increase, it was observed that the tensile strengths of the formed strands by the present process were 10% to 20% higher compared to the standard operation not employing the in-line drying of the present invention.

In Examples I-III using the 2000 hole bushing, the maximum evaporative rate of water for M fiber was about 69 gms/min., for K fiber about 62, for T fiber about 60 and for H fiber about 59 gms/min.

Example IV

In a commercial facility more than one year prior to the filing date of this application, another run was made employing substantially the same apparatus as set forth in the drawings. The run was made to produce M-250 E glass packages using a 4000 hole bushing. Strand speeds of about 2250 feet per minute were employed using a glass throughput of about 200 pounds per hour. During this run it was observed that the evaporation rate of water was approximately 173 grams per minute. Thus it will be observed that with the 4000 hole bushing an evaporation rate of in excess of three times that employed with the 2000 hole bushing was realized. During operation the temperature approximately 9 inches below the applicator was about 480° F. and the temperatures of the final forming formed package was about 210° F. There was no fuzz problem, the packages were migration free, and contained approximately 0-0.2% water.

While the above describes the present invention, it will of course be apparent that modifications are possible which pursuant to the patent statutes and laws do not depart from the spirit and scope of the present invention.

We claim:

1. In a glass manufacturing process comprising discharging a plurality of molten glass streams from a heated bushing, attenuating said plurality of glass streams into a plurality of fibers, passing said fibers to an applicator which applies an aqueous based size to said fibers, gathering said sized fibers into a strand at a gathering shoe and winding said strand on a collet to form a package, the improvement comprising substantially completely adiabatically evaporating the water from the size applied to said fibers using a chamber having its uppermost portion disposed beneath said bushing to cause adiabatic drying of said fibers using bushing heat so that the fibers of said package are dry and said package is free of migration.

2. The process of claim 1 wherein said adiabatically evaporating the water is done using a chamber which defines a confined some circumferentially disposed about said fibers and extending from below said heating bushing and above said applicator to a point beneath said applicator.

3. The improvement of claim 2 wherein the water content of the fibers on the package is between 0% to about 0.02% by weight.

4. The improvement of claim 3 wherein the temperature of the fibers wound on the collet is greater than about 130° F. and wherein the water content of the sized fibers at about the time of size application is about 10%.

5. In a method for producing a package of glass fibers comprising A) forming glass fibers from molten glass which is discharged from a heated bushing; B) moving said fibers downwardly and during said movement (i) applying an aqueous based size to said glass fibers with a size applicator and (ii) gathering said fibers with a gathering device into a strand; and C) winding said strand into said package with a winder the improvement comprising forming a substantially migration free package by drawing air into the zone adjacently downwardly of said heated bushing so as to heat said air and passing said heated air downwardly through a confined predetermined zone which circumscribes said fibers so as to be in heat transfer contact with said fibers, said zone being disposed from a point beneath said bushing, upwardly of said applicator to a point below said applicator, and removing said air from said zone at a location above said winder, the amount of said air and the length of said zone being effective to dry said fibers with said applied aqueous size a sufficient amount to form said migration free package.

6. The method of claim 5 wherein said heated air is effective to dry said fibers to less than about 0.02% water.

7. The method of claim 6 wherein the amount of size applied by said applicator is sufficient to provide an initial water content of about at least about 6%.

8. The method of claim 7 wherein said water content is about 10%.

9. The method of claim 7 wherein the temperature of the wound package is at least about 130° F.

10. The method of claim 9 wherein said package temperature is at least about 150° F.

11. The method of claim 10 wherein said package temperature is at least about 210° F.

12. The method of claim 5 wherein the temperature of the air adjacent said applicator in said zone is between about 350° F. to about 480° F.

13. In a method of making a package of glass fibers comprising: discharging molten glass from a heated bushing; forming said glass into fibers, and applying an aqueous based size to said fibers, the improvement comprising using bushing heat to heat air and using a chamber having its uppermost portion disposed beneath said bushing to cause adiabatic drying of said fibers using bushing heat said heated air to completely adiabatically dry the size on said fibers and thereby form a migration free package.

14. In a method for producing a package of glass fibers comprising A) forming glass fibers from molten glass which is discharged from a heated bushing; B) moving said fibers downwardly and during said movement (i) applying a liquid size to said glass fibers with a size applicator and (ii) gathering said fibers with a gathering device into a strand; and C) winding said strand into said package with a winder; the improvement comprising forming a migration free package by (iii) drawing ambient air from circumferentially about said bushing into the open uppermost end of a heat transfer chamber, said open end being disposed below said heated bushing and sufficiently close thereto so that the air being drawn into the open end is heated by said heated bushing, said chamber extending from above said size applicator and being circumferentially disposed about said fibers to a point beneath said applicator, (iv) moving said heated air through said chamber in concurrent, direct heat transfer contact with said fibers and (v) removing said heated air from said chamber adjacent the bottom end thereof, said air evaporating the fluid from said fluid sized fibers when in heat transfer contact.

15. The method of claim 14 wherein said chamber extends several feet beneath said applicator and said size is an aqueous based size and wherein said air is sufficiently heated so that the water is evaporated and the water content of the wound package is less than about 0.02% and wherein said evaporation is adiabatically effected.

16. The method of claim 15 wherein the water content of the fibers upon application of said size is about 10%.

17. The method of claim 13 wherein said applicator is disposed between about 20-30 inches below the bushing and wherein said uppermost end is disposed about nine to about sixteen inches below said bushing.

18. In a method for producing a glass fiber bundle from a plurality of fibers comprising, forming glass fibers from molten glass which is discharged from a heated bushing, moving said fibers downwardly and during said movement applying an aqueous based or solvent based size to said fibers with a size applicator and gathering said fibers with a gathering device into a bundle, the improvement comprising drying said glass fibers prior to said gathering by (i) drawing ambient air from circumferentially about said bushing into the open uppermost end of a heat transfer chamber, the open end of said chamber being disposed below said heated bushing and sufficiently close thereto that the air being drawn into the open end is heated by said heated bushing, the chamber extending from above the size applicator and being circumferentially disposed about said fibers to a point beneath said applicator, (ii) moving said heated air through the chamber in heat transfer contact with said fibers and (iii) removing said heated air from the chamber adjacent the bottom thereof, said air thereby evaporating said water or solvent.

19. The method of claim 18 wherein said air is sufficiently heated by said bushing so that said air substantially completely evaporates said water or said solvent and the bushing heat is substantially the sole source of energy for said heating air.

20. In an apparatus for forming a glass fiber package which is migration free comprising a heated bushing for supplying a plurality of streams of molten glass to be attenuated into fibers; winder means for attenuating said streams into said fibers and for winding a fiber strand into a package; means upstream of said winder means for gathering said fibers into a strand for winding; applicator means for applying a size composition to said fibers prior to said fibers being gathered into said strand; a chamber enveloping said fibers, the uppermost end of said chamber being located adjacently downwardly of said bushing upwardly of said applicator means, and the lower end of said chamber being located upwardly of said winder means and downwardly of said applicator means; and means for removing air adjacent the bottom of said chamber, said apparatus being so arranged and constructed that ambient air circumferentially about said bushing flows into said open end from beneath said bushing after being heated by said bushing and moves through said chamber in heat transfer contact with said fibers to dry said sized fibers and form said package which is migration free.

* * * * *